United States Patent
Fukunaga

(10) Patent No.: US 10,318,801 B2
(45) Date of Patent: Jun. 11, 2019

(54) IMAGE PROCESSING APPARATUS AND NON-TRANSITORY COMPUTER READABLE MEDIUM

(71) Applicant: FUJI XEROX CO., LTD., Tokyo (JP)

(72) Inventor: Masakazu Fukunaga, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 105 days.

(21) Appl. No.: 15/493,767

(22) Filed: Apr. 21, 2017

(65) Prior Publication Data

US 2018/0150688 A1    May 31, 2018

(30) Foreign Application Priority Data

Nov. 25, 2016  (JP) ................ 2016-228717

(51) Int. Cl.
| | |
|---|---|
| *G06K 9/00* | (2006.01) |
| *G06T 7/11* | (2017.01) |
| *G06T 7/13* | (2017.01) |
| *G06K 9/46* | (2006.01) |
| *G06K 9/32* | (2006.01) |
| *G06K 9/38* | (2006.01) |
| *G06K 9/52* | (2006.01) |

(52) U.S. Cl.
CPC ....... *G06K 9/00442* (2013.01); *G06K 9/3241* (2013.01); *G06K 9/38* (2013.01); *G06K 9/4671* (2013.01); *G06K 9/525* (2013.01); *G06T 7/11* (2017.01); *G06T 7/13* (2017.01); *G06T 2207/30176* (2013.01)

(58) Field of Classification Search
CPC ........ G06K 9/00442–9/00483; G06K 9/3241; G06K 9/38; G06K 9/4671; G06K 9/525; G06T 7/11; G06T 7/13
See application file for complete search history.

(56) References Cited

U.S. PATENT DOCUMENTS

| | | | |
|---|---|---|---|
| 6,248,830 B1 | 6/2001 | Matsuda et al. | |
| 7,376,268 B2 * | 5/2008 | Shirata .............. | G06K 9/00456 358/518 |
| 7,965,892 B2 * | 6/2011 | Kanatsu ............ | G06K 9/00456 382/167 |
| 2005/0180645 A1 * | 8/2005 | Hasegawa ......... | G06K 9/00456 382/239 |
| 2006/0171587 A1 * | 8/2006 | Kanatsu ............ | G06K 9/00456 382/173 |

(Continued)

FOREIGN PATENT DOCUMENTS

| | | |
|---|---|---|
| JP | 2958981 B2 | 10/1999 |
| JP | 2003-338920 A | 11/2003 |
| JP | 4795038 B2 | 10/2011 |

*Primary Examiner* — Sean T Motsinger
(74) *Attorney, Agent, or Firm* — Sughrue Mion, PLLC

(57) ABSTRACT

An image processing apparatus includes a first extraction unit, a second extraction unit, and a third extraction unit. The first extraction unit extracts a first area in an image that includes plural document images, the first area having low-frequency characteristics. The second extraction unit extracts a second area in the image, the second area having high-frequency characteristics. The third extraction unit extracts areas of the document images by combining the first area and the second area in accordance with whether a background of the image is white.

10 Claims, 14 Drawing Sheets

(56) References Cited

U.S. PATENT DOCUMENTS

| | | | |
|---|---|---|---|
| 2011/0002015 A1* | 1/2011 | Hayakawa | H04N 1/00795 358/448 |
| 2011/0013847 A1* | 1/2011 | Statsenko | G06K 9/00456 382/224 |
| 2014/0376060 A1* | 12/2014 | Bocharov | H04N 1/23 358/474 |
| 2016/0283818 A1* | 9/2016 | Liu | G06K 9/4652 |
| 2018/0150688 A1* | 5/2018 | Fukunaga | G06K 9/3241 |
| 2018/0152594 A1* | 5/2018 | Fukunaga | H04N 1/00037 |

* cited by examiner

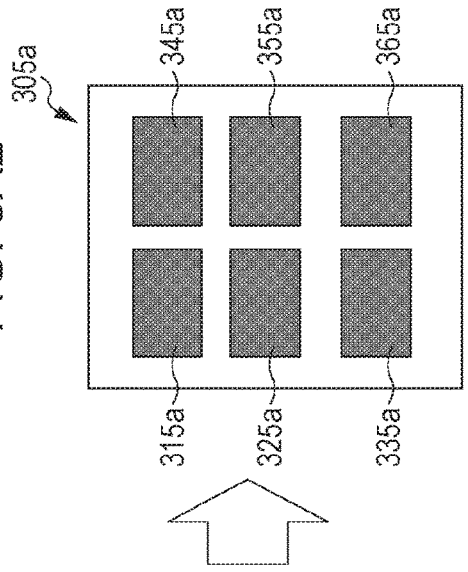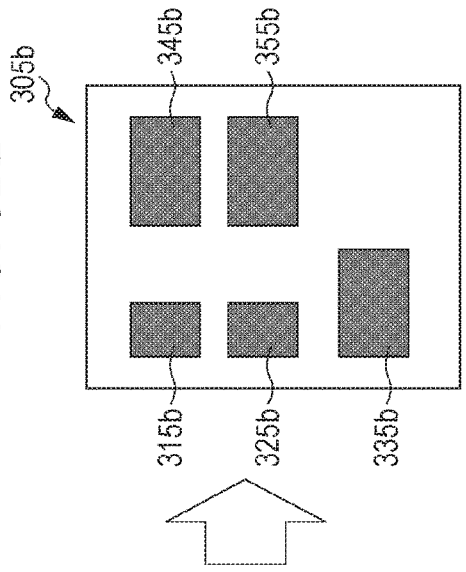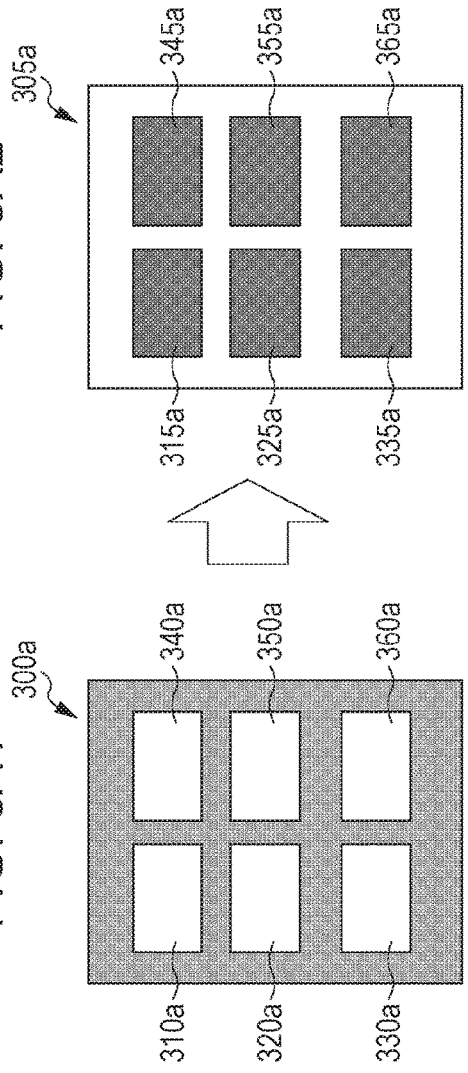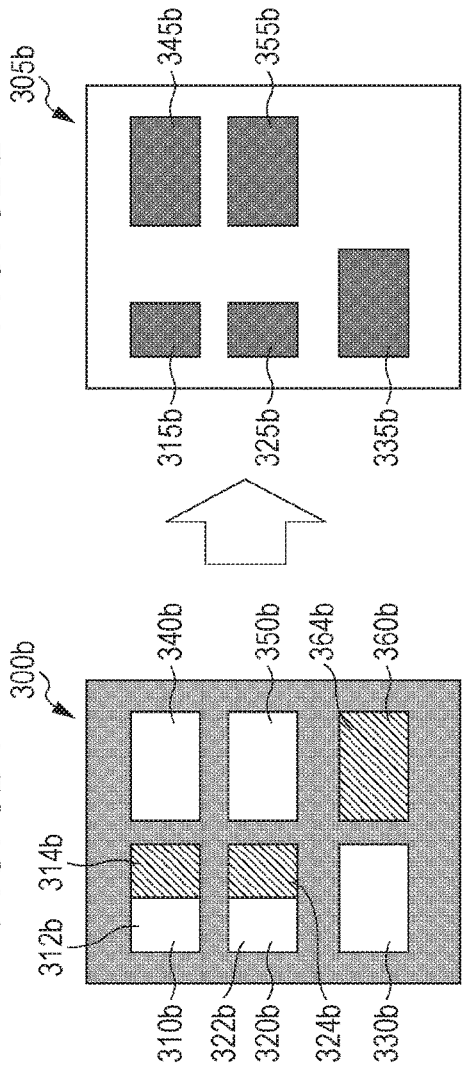

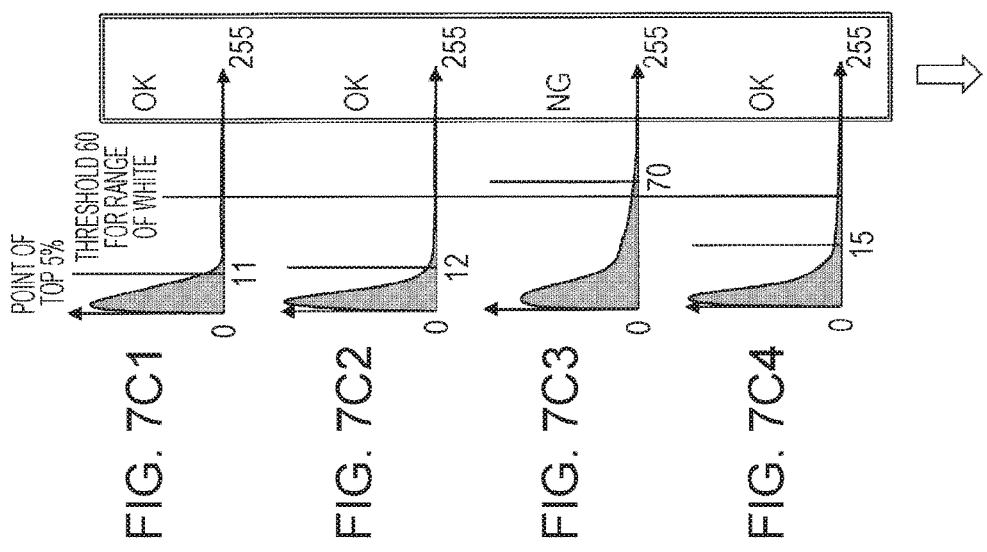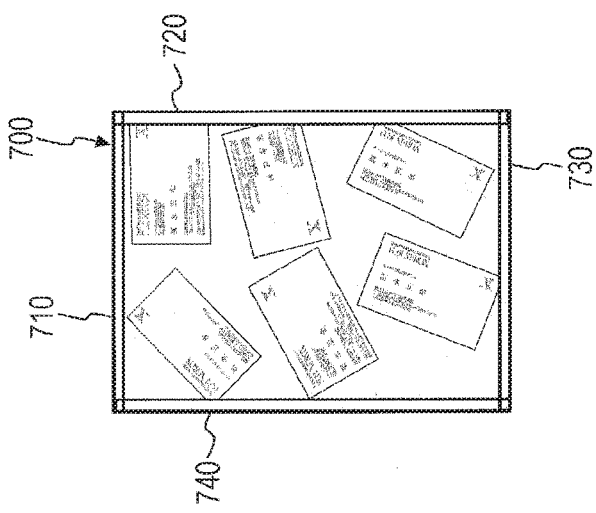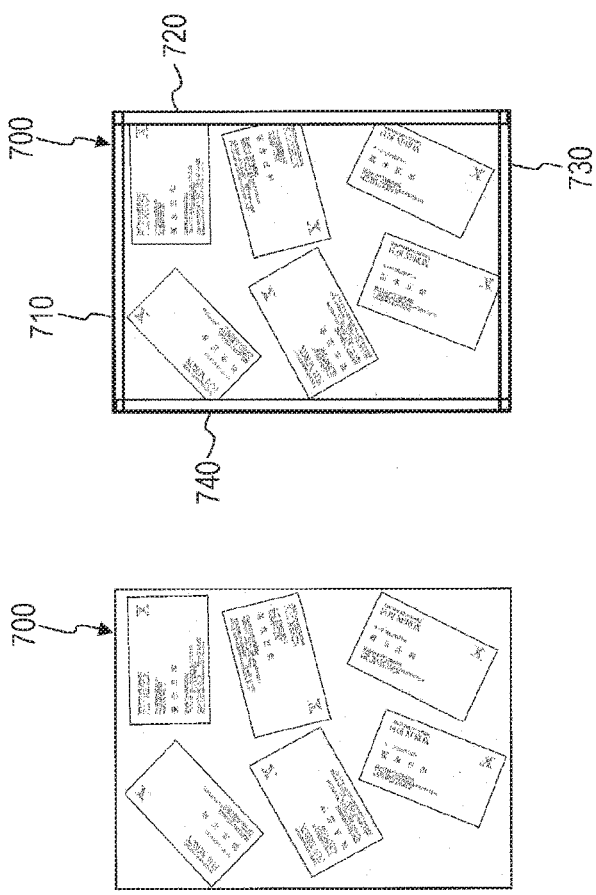

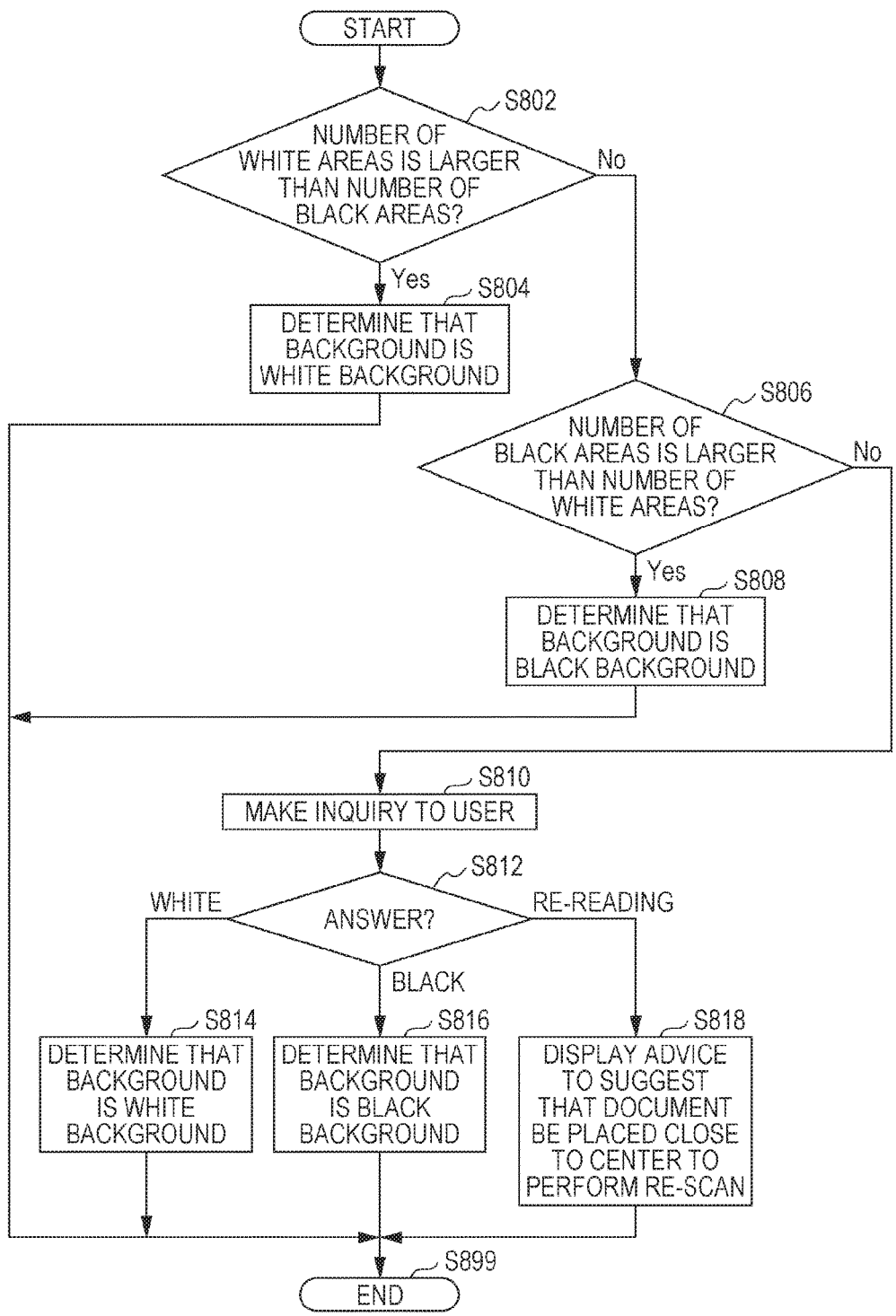

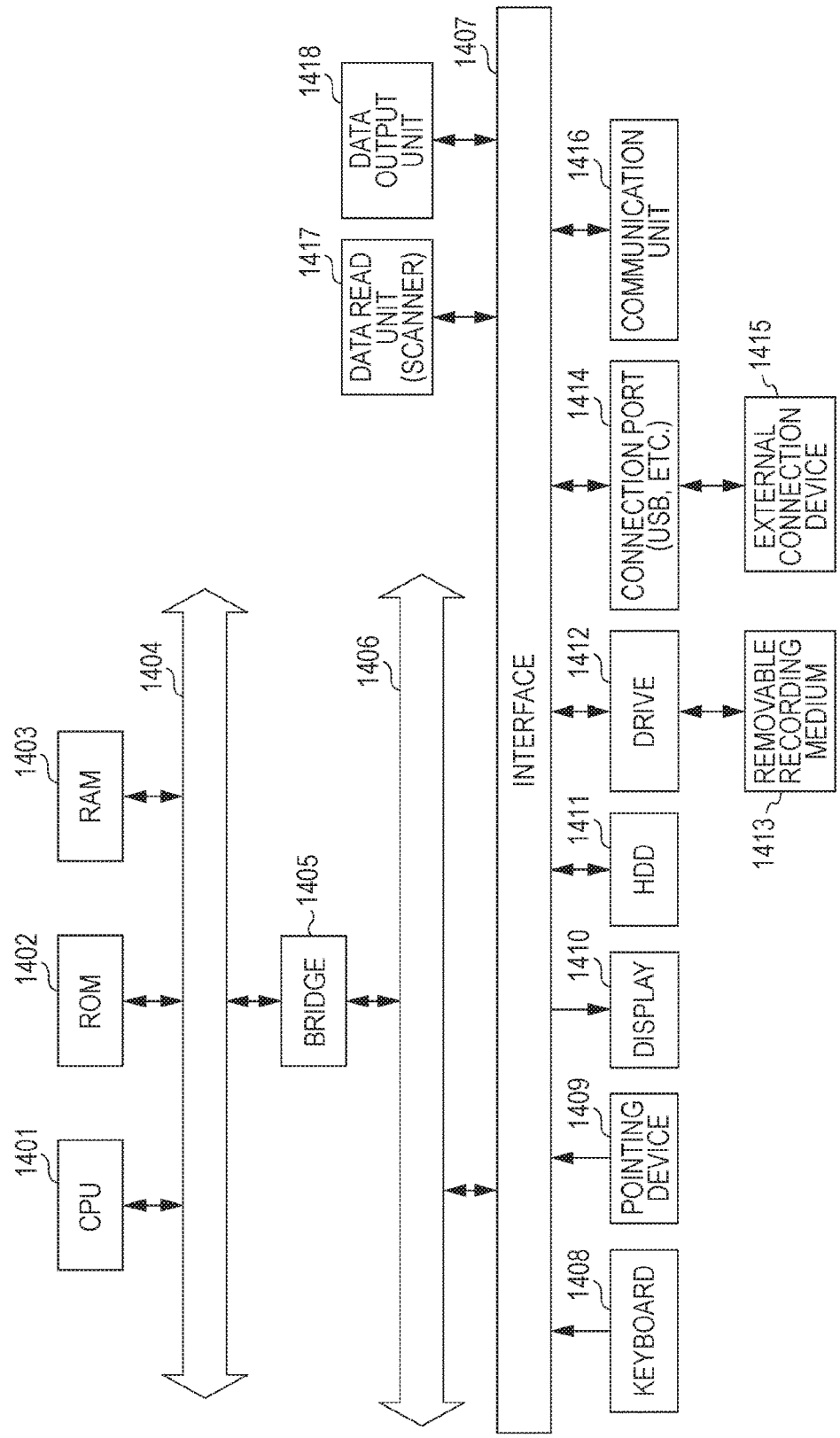

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-228717 filed Nov. 25, 2016.

BACKGROUND

Technical Field

The present invention relates to an image processing apparatus and a non-transitory computer readable medium.

SUMMARY

According to an aspect of the invention, there is provided an image processing apparatus including a first extraction unit, a second extraction unit, and a third extraction unit. The first extraction unit extracts a first area in an image that includes plural document images, the first area having low-frequency characteristics. The second extraction unit extracts a second area in the image, the second area having high-frequency characteristics. The third extraction unit extracts areas of the document images by combining the first area and the second area in accordance with whether a background of the image is white.

BRIEF DESCRIPTION OF THE DRAWINGS

An exemplary embodiment of the present invention will be described in detail based on the following figures, wherein:

FIGS. 3A1 to 3B2 are explanatory diagrams illustrating example processes for extracting document images without employing an exemplary embodiment of the present invention;

FIGS. 7A to 7C4 are explanatory diagrams illustrating an example process according to an exemplary embodiment of the present invention;

FIG. 8 is a flowchart illustrating an example process according to an exemplary embodiment of the present invention;

FIG. 14 is a block diagram illustrating an example hardware configuration of a computer used to implement an exemplary embodiment of the present invention.

DETAILED DESCRIPTION

Hereinafter, an exemplary embodiment of the present invention will be described with reference to the drawings.

Figure 1:
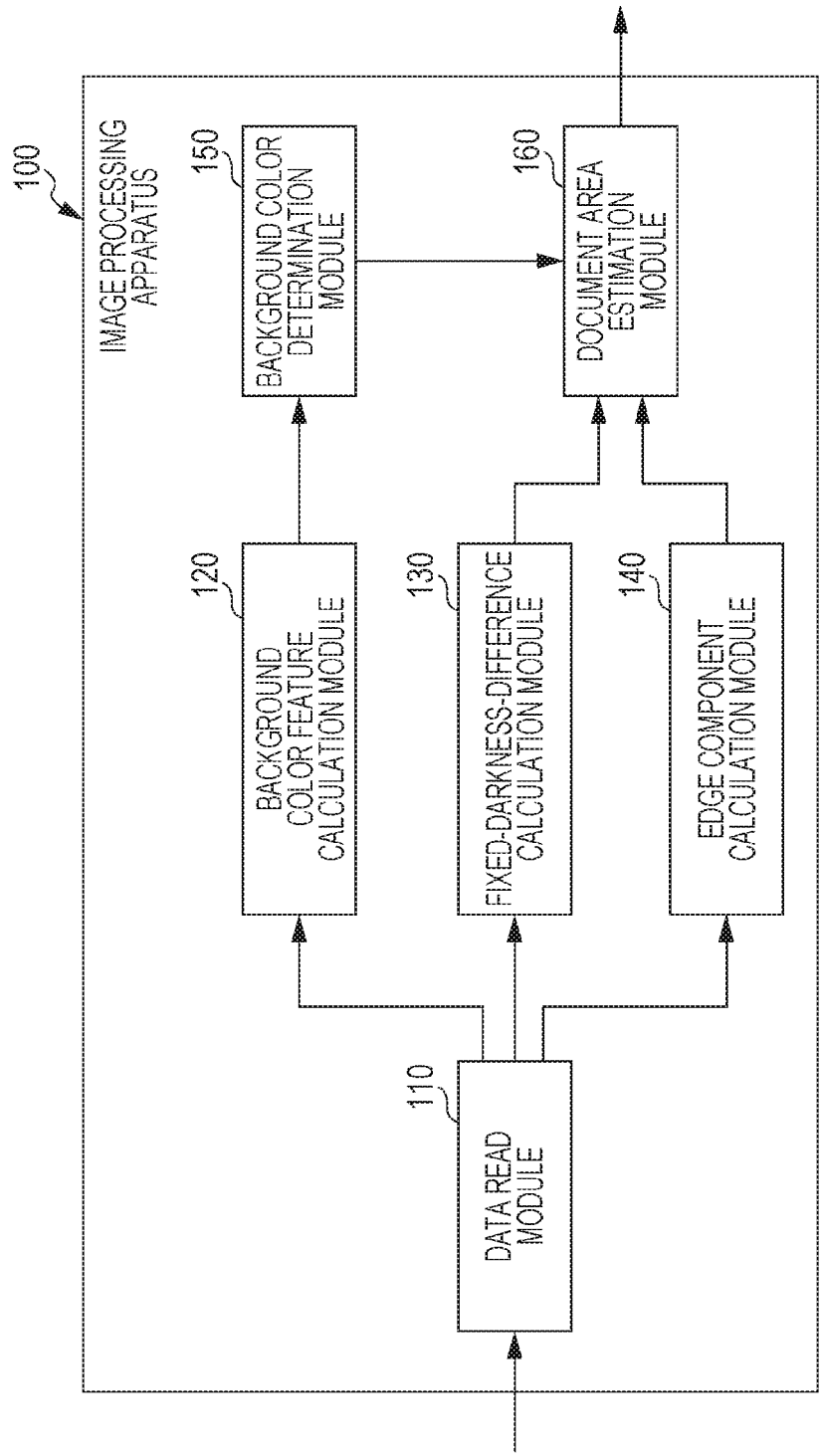
FIG. 1 is a block diagram schematically illustrating an example module configuration according to an exemplary embodiment of the present invention.

FIG. 1 is a block diagram schematically illustrating an example module configuration according to this exemplary embodiment.

Note that a module generally refers to a software component (computer program), a hardware component, or any other type of component that is logically isolatable. Therefore, modules described in this exemplary embodiment refer to not only modules in a computer program but also modules in a hardware configuration. Accordingly, description is given in this exemplary embodiment for also describing a computer program for causing a computer to function as the modules (a program for causing a computer to perform the procedures of the modules, a program for causing a computer to function as the units of the modules, or a program for causing a computer to implement the functions of the modules), a system, and a method. Although the terms "store" and "be stored" and terms similar to "store" and "be stored" are used for convenience of description, these terms mean to store something on a storage device or to perform control to store something on a storage device in a case where an exemplary embodiment relates to a computer program. Although one module may correspond to one function, one module may be configured by using one program, or plural modules may be configured by using one program in implementation. Alternatively, one module may be configured by using plural programs. Plural modules may be executed by one computer, or one module may be executed by plural computers that are in a distributed or parallel environment. One module may include another module. The term "connection" described below is used in a case of a physical connection and also in a case of a logical connection (such as an exchange of data, an instruction, a reference relation between pieces of data, and so on). The term "predetermined" means that something is determined prior to a target process and is used to mean that something is determined before a process according to this exemplary embodiment starts, as a matter of course, or before a target process starts even after a process according to this exemplary embodiment has started, in accordance with the situation or condition at the time or the situation or condition up to the time. In a case where plural "predetermined values" are present, the values may differ from one another, or two or more of the values (or all values, as a matter of course) may be the same. A description "if A, then B is performed" is used to mean that "it is determined whether A or not and, if it is determined to be A, B is performed", except for a case where determination as to whether A or not is not necessary.

The term "system or apparatus" corresponds to a configuration in which plural computers, hardware units, apparatuses, and so on are connected to one another via a communication system, such as a network (including one-to-one communication connections), and also corresponds to a configuration in which a system or an apparatus is constituted by one computer, one hardware unit, or one apparatus, for example. The term "apparatus" may be used as a synonym for the term "system". As a matter of course, the term "system" does not mean a mere social "mechanism" (social system), which is an artificial arrangement.

Target information is read from a storage device each time a process is performed by each module or, in a case where plural processes are performed by a module, each time each process is performed, and the result of processing is written to the storage device after the process has been performed. Accordingly, description of reading from a storage device before processing and writing to the storage device after processing may be omitted. A storage device mentioned here may include a hard disk, a random access memory (RAM), an external storage medium, a storage device connected via a communication line, a register in a central processing unit (CPU), and so on.

An image processing apparatus 100 of this exemplary embodiment extracts, from an image including plural document images, the document images. The image processing apparatus 100 includes a data read module 110, a background color feature calculation module 120, a fixed-darkness-difference calculation module 130, an edge component calculation module 140, a background color determination module 150, and a document area estimation module 160, as illustrated in the example in FIG. 1.

For example, an image of documents, such as business cards or receipts, is read, a character recognition process, for example, is performed, and a process for generating a business-card database or an accounting process, for example, is performed. In an image read (scan) process, plural documents placed on a read table (also called a document glass or platen) are read in a single scan process because the documents are small. Here, plural document images need to be extracted from one image obtained in a single scan process. In order to increase the precision of extraction of document images, a black sheet is used to create a black background in a technique described in Japanese Unexamined Patent Application Publication No. 2003-338920, for example, because documents, such as business cards or receipts, are typically white.

However, it is difficult to detect a document in a color close to the color of the black sheet. A specially designed business card may be filled with a color close to black, for example.

Further, an operator is not necessarily use a black sheet and may have plural documents read while using a white background.

The data read module 110 is connected to the background color feature calculation module 120, the fixed-darkness-difference calculation module 130, and the edge component calculation module 140. The data read module 110 receives an image that includes plural document images. Receiving an image is reading an image by using, for example, a scanner or a camera, receiving an image from an external device via a communication line by using, for example, a facsimile machine, or reading an image stored in, for example, a hard disk (a hard disk that is built in the image processing apparatus 100 or a hard disk connected to the image processing apparatus 100 over a network), for example. The image is a multi-value image (may be a color image).

In a case where a document is read, the document may be read by using a backing sheet in a color other than white (for example, a dark color with low brightness, such as black, dark blue, or dark gray, or a color, such as a metallic color, having varying reflection properties for read light, which is hereinafter referred to as "black" in this exemplary embodiment) or may be read by using a white backing sheet. The color of the backing sheet is the background color of the image. A document may be read without using a backing sheet. In this case, the color of the back side of the platen cover (for example, white) is the background color of the image. A predetermined backing sheet (which is an accessory, for example, of a product in which the image processing apparatus 100 is built) may be used, or a backing sheet provided by the operator may be used. Alternatively, a copy may be made with the platen cover being left open, for example, to create a black sheet.

Note that the operator may be recommended to use a black backing sheet when they have plural documents read. In a case where an instruction for "having plural documents read" is provided, for example, use of a black backing sheet may be suggested on a display. However, the operator does not necessarily use a black backing sheet in accordance with the suggestion.

The background color feature calculation module 120 is connected to the data read module 110 and the background color determination module 150. The background color feature calculation module 120 checks a predetermined area in the image received by the data read module 110 and extracts a feature value from the distribution of the brightness values of pixels in the predetermined area. The "predetermined area" is, for example, a peripheral area of the image (in a case where the image has a rectangular shape (rectangle or square shape), an area along the four edges) because a document is less likely to be present in the area. Further, plural areas are set in a single image, the results of estimation of the background color based on the respective areas are collected, and the background color determination module 150 finally determines the background color. The details are described below with reference to the example in FIGS. 7A to 7C4. As a result, unlike a special folder in which business cards, for example, are set as described in Japanese Patent No. 4795038, for example, it is not necessary to provide, at a fixed place of the special folder, an area used to determine whether a black sheet is used. That is, a special folder, for example, is not necessary in this exemplary embodiment, and a sheet of a dark color prepared by a user (for example, a black sheet created by making a copy with the platen cover being left open as described above) may be used.

The fixed-darkness-difference calculation module 130 is connected to the data read module 110 and the document area estimation module 160. The fixed-darkness-difference calculation module 130 extracts a first area having low-frequency characteristics in the image received by the data read module 110. The fixed-darkness-difference calculation module 130 may extract the first area by performing, for example, a binarization process. The binarization process may be a simple binarization process, for example, in which labeling is performed in accordance with a comparison with a threshold.

The fixed-darkness-difference calculation module 130 may determine the threshold by using the result of processing by the background color feature calculation module 120.

For example, if the threshold for the simple binarization is determined from the average color, a backing sheet other than a black sheet may be used.

The edge component calculation module 140 is connected to the data read module 110 and the document area estimation module 160. The edge component calculation module 140 extracts a second area having high-frequency characteristics in the image received by the data read module 110. The edge component calculation module 140 may extract the second area by performing an edge detection process or a color difference detection process. In the edge detection process, the Sobel filter or the Canny edge filter, for example, may be used. In the color difference detection process, color difference signals (for example, R-Y and B-Y) may be used.

The background color determination module 150 is connected to the background color feature calculation module 120 and the document area estimation module 160. The background color determination module 150 determines whether the background is white on the basis of a feature value extracted by the background color feature calculation module 120. For example, the background color determination module 150 determines whether the background is white on the basis of the brightness values of pixels in the peripheral area of the image. More specifically, the background color determination module 150 may determine whether the background of the image is white by using the result of determination as to whether each of the four peripheral areas is white.

The document area estimation module 160 is connected to the fixed-darkness-difference calculation module 130, the edge component calculation module 140, and the background color determination module 150. The document area estimation module 160 extracts the area of a document image by combining the first area and the second area in accordance with whether the background of the image is white (the result of determination by the background color determination module 150). For example, the document area estimation module 160 extracts the area of a document image by combining the first area and the second area in a ratio determined in accordance with whether the background of the image is white.

Here, the ratio in which the first area and the second area are combined may be a ratio of 1 to 1, for example, in which the areas are equally used or a ratio of 7 to 3, for example, in which one of the areas is used preferentially over the other. Alternatively, only one of the areas may be used. In the case where only one of the areas is used, namely, in a case where only the second area is used, for example, the second area is the area of a document image.

In the case where the background of the image is not white, the document area estimation module 160 may extract the area of a document image by using both the first area and the second area. In the case where the background of the image is white, the document area estimation module 160 may extract the area of a document image by preferentially using the second area. Here, "preferentially using" also means extracting the area of a document image by using only the second area without using the first area. That is, the second area is synonymous with the area of a document image.

Figure 13:
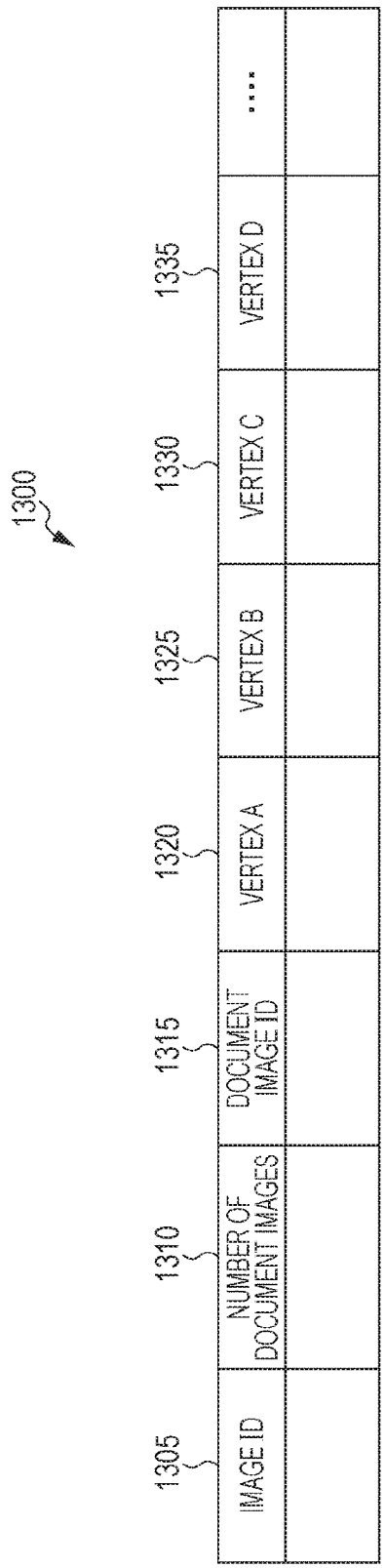
FIG. 13 is an explanatory diagram illustrating an example data structure of a process result table.

The document area estimation module 160 generates a process result table 1300, for example, as a result of processing. FIG. 13 is an explanatory diagram illustrating an example data structure of the process result table 1300. The process result table 1300 includes an image identification (ID) column 1305, a number-of-document-images column 1310, a document image ID column 1315, a vertex A column 1320, a vertex B column 1325, a vertex C column 1330, and a vertex D column 1335, for example. In the image ID column 1305, information (image ID) for uniquely identifying an image received by the data read module 110 in this exemplary embodiment is stored. In the number-of-document-images column 1310, the number of document images is stored. Subsequent to the number-of-document-images column 1310, a set of columns from the document image ID column 1315 to the vertex D column 1335 are provided for the number of document images. In the document image ID column 1315, information (document image ID) for uniquely identifying a document image is stored in this exemplary embodiment. In the vertex A column 1320, the coordinates of a vertex A are stored. In the vertex B column 1325, the coordinates of a vertex B are stored. In the vertex C column 1330, the coordinates of a vertex C are stored. In the vertex D column 1335, the coordinates of a vertex D are stored.

The document area estimation module 160 outputs the image and the process result table 1300 or extracts document images from the image by referring to the process result table 1300 and outputs the document images. Outputting the extracted document images is printing the document images by using a printer, displaying the document images on a display, transmitting the document images by using an image transmission apparatus, such as a facsimile machine, writing the document images to an image storage device, such as an image database, storing the document images in a storage medium, such as a memory card, or passing the document images to another information processing apparatus (for example, a document processing apparatus 250 described below), for example.

Figure 2A:
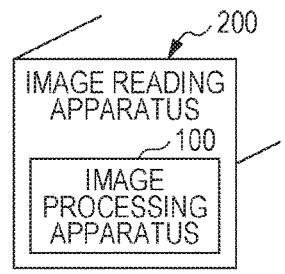
FIGS. 2A and 2B are explanatory diagrams illustrating example system configurations employing an exemplary embodiment of the present invention.
Figure 2B:
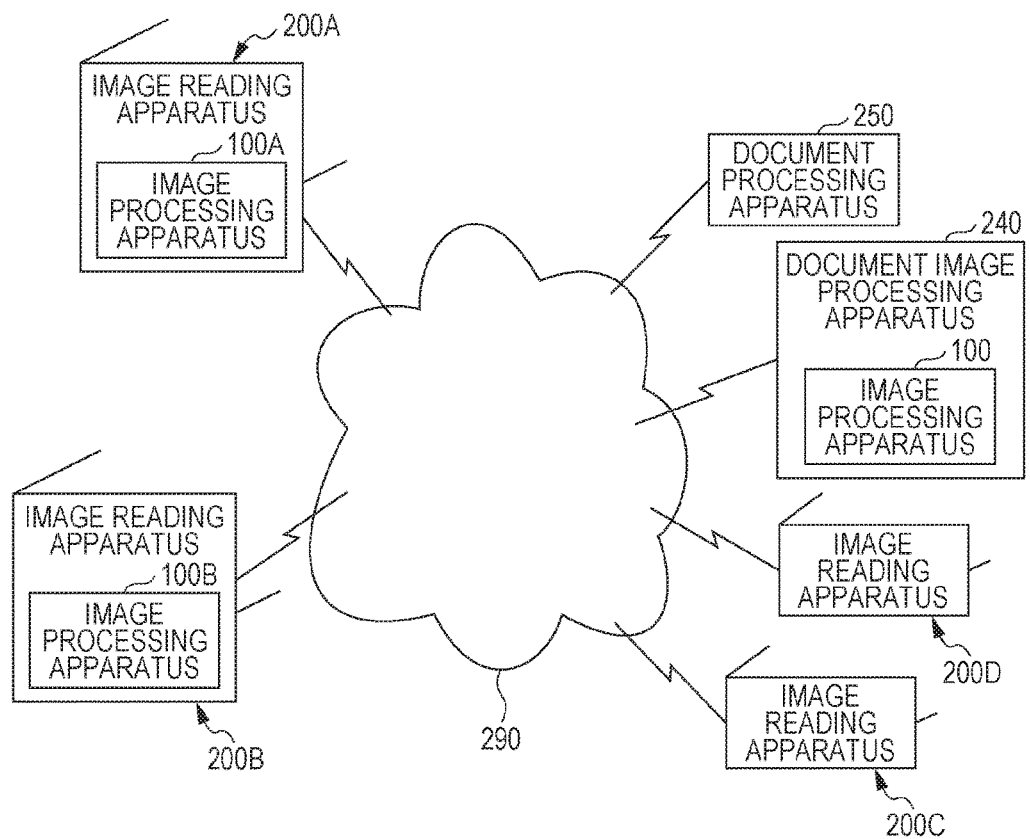

FIGS. 2A and 2B are explanatory diagrams illustrating example system configurations employing this exemplary embodiment.

The example in FIG. 2A illustrates a case of a stand-alone configuration. An image reading apparatus 200 includes the image processing apparatus 100.

For example, an operator places plural documents on the platen of the image reading apparatus 200 and instructs the image processing apparatus 100 to perform a process for extracting plural document images. As a backing sheet that serves as the background, a black backing sheet may be used or a white backing sheet may be used. The result of extraction may be printed or output to a universal serial bus (USB) memory, for example.

The example in FIG. 2B illustrates a case where a system is configured by using a communication line 290. An image reading apparatus 200A, an image reading apparatus 200B, an image reading apparatus 200C, an image reading apparatus 200D, a document image processing apparatus 240, and the document processing apparatus 250 are connected to one another via the communication line 290. The communication line 290 may be a wireless line, a wired line, or a combination of a wireless line and a wired line, or may be the Internet or an intranet, for example, that serves as a communication infrastructure. Functions implemented by the document image processing apparatus 240 and the document processing apparatus 250 may be implemented as cloud services.

The image reading apparatus 200A includes an image processing apparatus 100A. The image reading apparatus 200B includes an image processing apparatus 100B. The document image processing apparatus 240 includes the image processing apparatus 100.

For example, an operator places plural documents on the platen of the image reading apparatus 200A. As a backing sheet that serves as the background, a black backing sheet may be used or a white backing sheet may be used. Then, the operator instructs the image processing apparatus 100A to perform a process for extracting plural document images. The image processing apparatus 100A transmits to the document processing apparatus 250 an image that includes the plural document images and the process result table 1300 that includes the result of extraction, or the document images extracted from the image by referring to the process result table 1300. The document processing apparatus 250 performs a character recognition process on the document images, and performs a process for generating a business-card database in a case where the document images are images of business cards, or an accounting process in a case where the document images are images of receipts, for example.

The image reading apparatus 200C and the image reading apparatus 200D that do not include the image processing apparatus 100 may use the document image processing apparatus 240. For example, an operator places plural documents on the platen of the image reading apparatus 200C. As a backing sheet that serves as the background, a black backing sheet may be used or a white backing sheet may be used. The image reading apparatus 200C reads the documents and transmits an image obtained as a result of reading to the document image processing apparatus 240. The image processing apparatus 100 in the document image processing apparatus 240 performs a process for extracting plural document images, and the document image processing apparatus 240 performs, on the result of the extraction process, a process (a process for generating a business-card database or an accounting process, for example) similar to that performed by the document processing apparatus 250.

FIGS. 3A1 to 3B2 are explanatory diagrams illustrating example processes for extracting document images without employing this exemplary embodiment. Here, example processes performed in a case of a black background are illustrated.

One of the example processes is an example process in which a simple binarization process is performed on an image 300a illustrated in the example in FIG. 3A1, and a process result image 305a illustrated in the example in FIG. 3A2 is obtained. The image 300a is an image obtained by reading six business cards using a black backing sheet.

In the image 300a, a business-card image 310a, a business-card image 320a, a business-card image 330a, a business-card image 340a, a business-card image 350a, and a business-card image 360a are arranged. The business-card image 310a and the other business-card images are mostly white, and therefore, a business-card image area 315a, a business-card image area 325a, a business-card image area 335a, a business-card image area 345a, a business-card image area 355a, and a business-card image area 365a are successfully extracted from the process result image 305a as a result of a simple binarization process. That is, the business-card image area 315a and the other business-card image areas, which correspond to white documents, are successfully and correctly extracted as foreground images. In FIG. 3A2, the results of extraction are illustrated in black.

The other example process is an example process in which a simple binarization process is performed on an image 300b illustrated in the example in FIG. 3B1, and a process result image 305b illustrated in the example in FIG. 3B2 is obtained. The image 300b is an image obtained by reading six business cards using a black backing sheet. Some of the business-card images are images of specially designed business cards. For example, a business-card image 310b is formed of a white area image 312b and a blue area image 314b. A business-card image 320b is formed of a white area image 322b and a blue area image 324b. A business-card image 360b is formed of a blue area image 364b.

In the image 300b, the business-card image 310b, the business-card image 320b, a business-card image 330b, a business-card image 340b, a business-card image 350b, and the business-card image 360b are arranged. The business-card image 310b, for example, includes the blue area image 314b in a color close to the color of the backing sheet, namely, black, and therefore, only a business-card image area 315b is extracted in a simple binarization process, and the area corresponding to the blue area image 314b is not extracted. That is, the business-card image area 315b, a business-card image area 325b, a business-card image area 335b, a business-card image area 345b, and a business-card image area 355b are extracted from the process result image 305b. That is, regarding the business-card image 310b, only the portion corresponding to the white area image 312b is detected and the portion corresponding to the blue area image 314b is not detected. Regarding the business-card image 320b, only the portion corresponding to the white area image 322b is detected and the portion corresponding to the blue area image 324b is not detected. Further, the business-card image 360b is not detected. That is, a dark portion (the blue area image 314b, for example) is processed as the background in a simple binarization process, and therefore, required detection of the document images fails.

Figure 4:
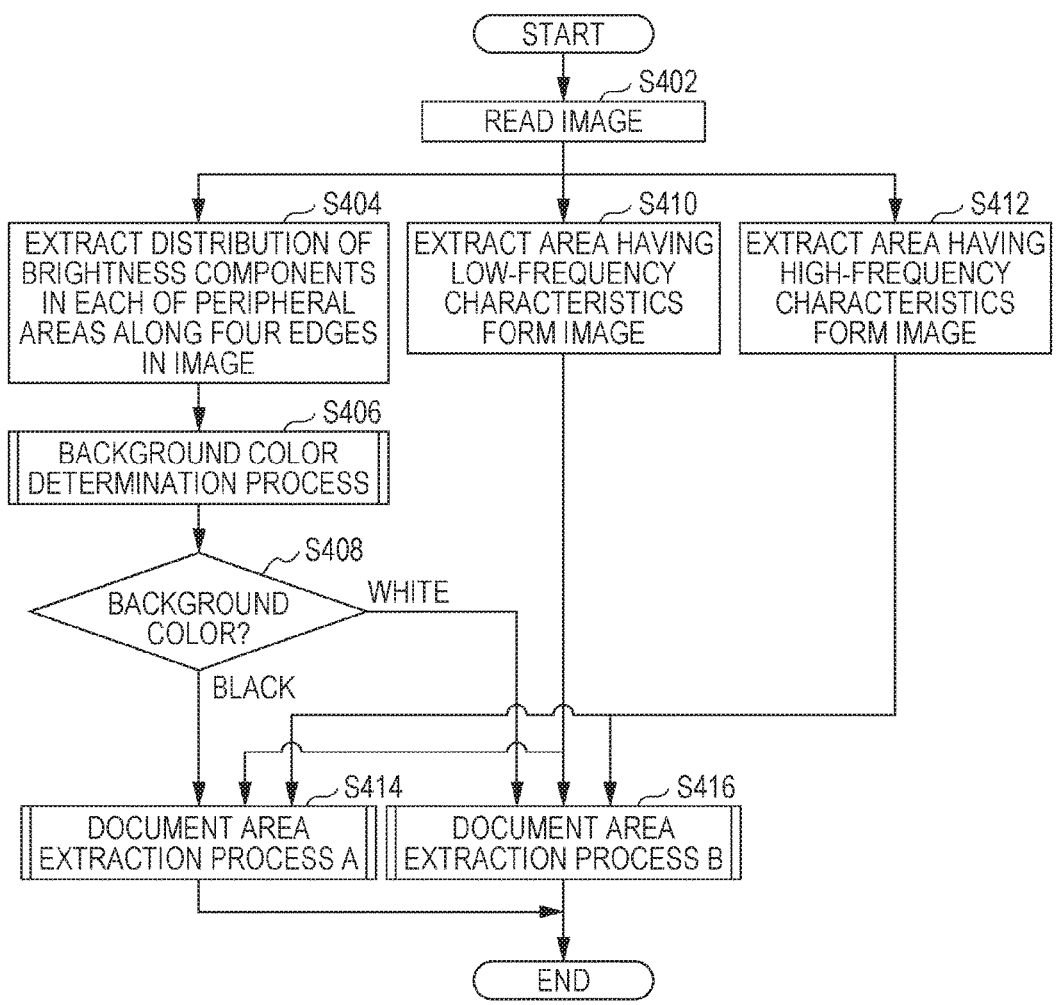
FIG. 4 is a flowchart illustrating an example process according to an exemplary embodiment of the present invention.

FIG. 4 is a flowchart illustrating an example process according to this exemplary embodiment.

In step S402, the data read module 110 reads an image, and the flow proceeds to step S404, step S410, and step S412.

In step S404, the background color feature calculation module 120 extracts the distribution of the brightness components of pixels in each of the peripheral areas along the four edges in the image.

In step S406, the background color determination module 150 performs a background color determination process. The details of the process in step S406 are described below with reference to the example flowchart illustrated in FIG. 5 or FIG. 6.

In step S408, the background color determination module 150 determines the background color. If the background color is black, the flow proceeds to step S414. If the background color is white, the flow proceeds to step S416.

In step S410, the fixed-darkness-difference calculation module 130 extracts an area having low-frequency characteristics form the image, and the flow proceeds to step S414 and step S416.

In step S412, the edge component calculation module 140 extracts an area having high-frequency characteristics from the image, and the flow proceeds to step S414 and step S416.

In step S414, the document area estimation module 160 performs a document area extraction process A. The details of the process in step S414 are described below with reference to the example flowchart illustrated in FIG. 9.

In step S416, the document area estimation module 160 performs a document area extraction process B. The details of the process in step S416 are described below with reference to the example flowchart illustrated in FIG. 11.

Note that the process in step S404, that in step S410, and that in step S412 may be performed in parallel or may be sequentially performed. The process in step S410 and that in step S412 may be performed after the determination process in step S408 (before step S414 and step S416). Further, if it is determined that the background is white in step S408, only the process in step S412 may be performed (and the process in step S410 need not be performed).

Figure 5:
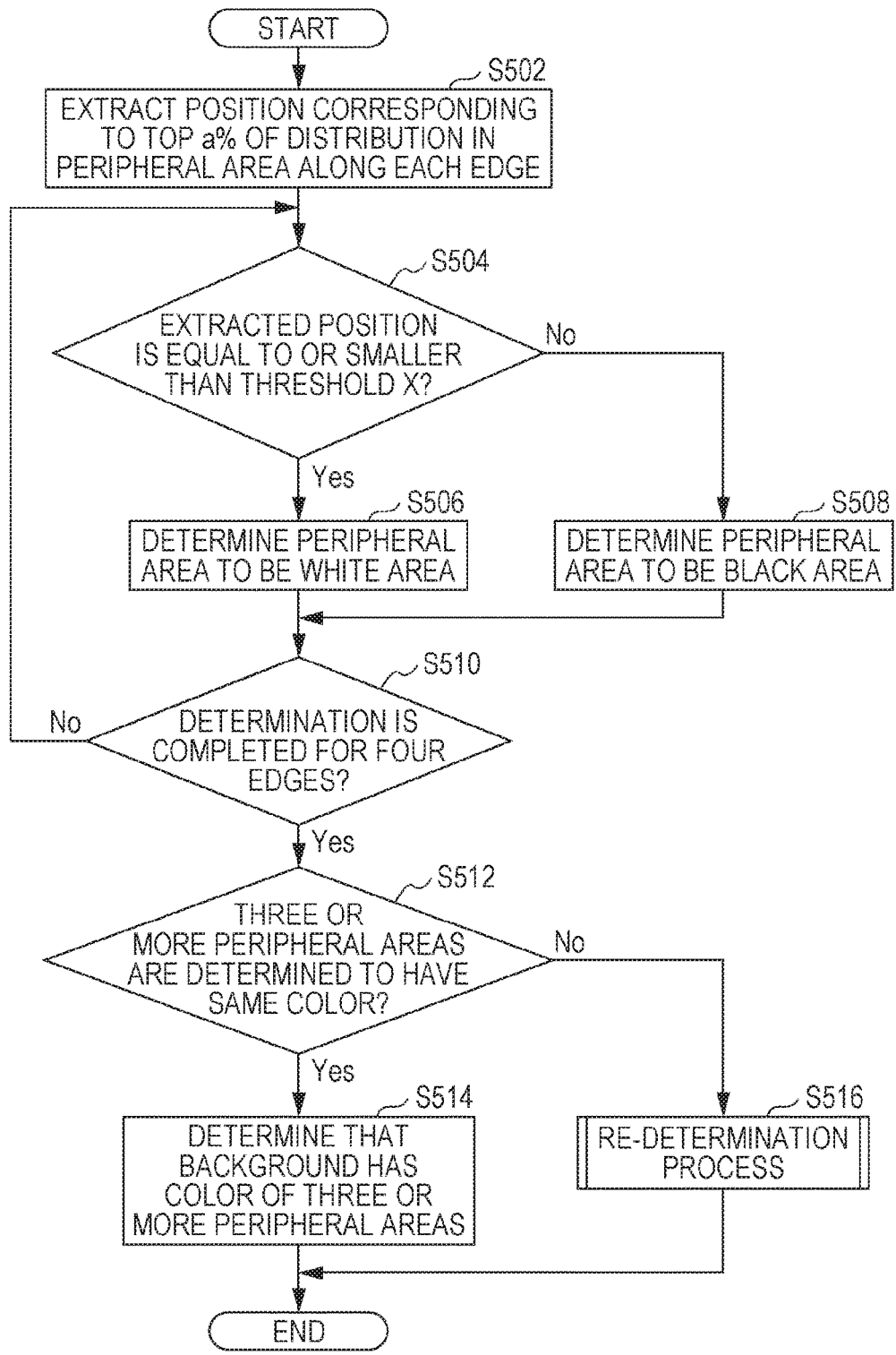
FIG. 5 is a flowchart illustrating an example process according to an exemplary embodiment of the present invention.

FIG. 5 is a flowchart illustrating an example process according to this exemplary embodiment. The example process is an example of the process in step S406, which is described below with reference to the example illustrated in FIGS. 7A to 7C4.

In step S502, the position (brightness value) corresponding to the top a % of the distribution of the brightness values of pixels in the peripheral area along each edge is extracted. For example, an image 700 illustrated in FIG. 7A is assumed to be a target. The image 700 includes plural business-card images. The distribution of the brightness values of pixels in each of the areas along the four edges of the image 700, namely, an upper edge area 710, a right edge area 720, a lower edge area 730, and a left edge area 740 illustrated in the example in FIG. 7B, is determined. Specifically, the number of pixels corresponding to each brightness value (each value between 0 and 255 in the examples in FIGS. 7C1 to 7C4) is counted. In the example graphs illustrated in FIGS. 7C1 to 7C4, the horizontal axis represents the brightness value, where the left end corresponds to 0 (white) and the right end corresponds to 255 (black), and the vertical axis represents the number of pixels corresponding to each brightness value. The graph in FIG. 7C1 represents the distribution of the brightness values of pixels in the upper edge area 710. The graph in FIG. 7C2 represents the distribution of the brightness values of pixels in the right edge area 720. The graph in FIG. 7C3 represents the distribution of the brightness values of pixels in the lower edge area 730. The graph in FIG. 7C4 represents the distribution of the brightness values of pixels in the left edge area 740. In FIGS. 7C1 to 7C4, the top 5% is assumed to be the "top a %". Here, "top" refers to a group of pixels having a brightness value close to 255. A state where the position of the "top a %" is low (close to zero) means that the number of black pixels is small (the number of white pixels is large). In the graph in FIG. 7C1, the position is at "11". In the graph in FIG. 7C2, the position is at "12". In the graph in FIG. 7C3, the position is at "70". In the graph in FIG. 7C4, the position is at "15".

In step S504, it is determined whether the extracted position is equal to or smaller than a threshold X. If the extracted position is equal to or smaller than the threshold X, the flow proceeds to step S506, otherwise the flow proceeds to step S508. For example, the "threshold X" is set to 60 in FIGS. 7C1 to 7C4. Therefore, in the determination process in step S504, the result of determination is "Yes" for the graph in FIG. 7C1, "Yes" for the graph in FIG. 7C2, "No" for the graph in FIG. 7C3, and "Yes" for the graph in FIG. 7C4. That is, among the four peripheral areas, three peripheral areas are determined to be white areas and one peripheral area is determined to be an area that is not a white area.

In step S506, the peripheral area is determined to be a white area.

In step S508, the peripheral area is determined to be a black area. As a matter of course, black is an example of a color that is not white.

In step S510, it is determined whether determination is completed for all of the four edges. If determination is completed for all of the four edges, the flow proceeds to step S512, otherwise the flow returns to step S504.

In step S512, it is determined whether three or more peripheral areas are determined to have the same color. If three or more peripheral areas are determined to have the same color, the flow proceeds to step S514, otherwise the flow proceeds to step S516.

In step S514, it is determined that the background has the color of the three or more peripheral areas. In the example in FIGS. 7C1 to 7C4, three peripheral areas are determined to be white areas, and therefore, the background of the image 700 is determined to be white. As a matter of course, if three peripheral areas are determined to be black areas, the background of the image 700 is determined to be black.

In step S516, a re-determination process is performed. The details of the process in step S516 are described below with reference to the example flowchart illustrated in FIG. 8.

Figure 6:
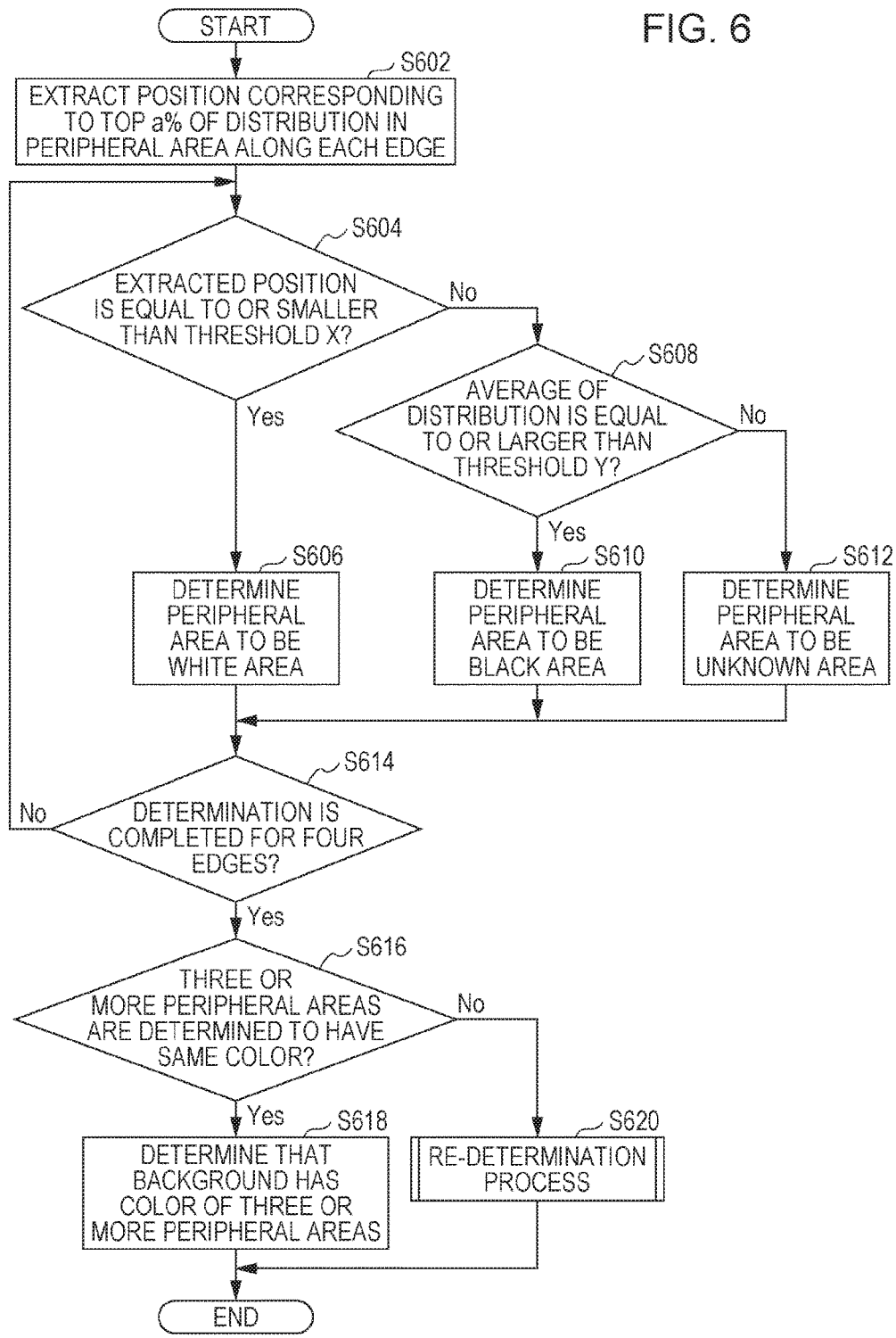
FIG. 6 is a flowchart illustrating an example process according to an exemplary embodiment of the present invention.

FIG. 6 is a flowchart illustrating an example process according to this exemplary embodiment. The example process is an example of the process in step S406. In the example flowchart illustrated in FIG. 5, the peripheral area is determined to be black if the peripheral area is not white; however, a determination process (in step S608) for determining whether the peripheral area is a black area is added in FIG. 6. The processes other than the process in step S608 and that in step S612 are the same as those illustrated in the example in FIG. 5.

In step S602, the position corresponding to the top a % of the distribution of the brightness values of pixels in the peripheral area along each edge is extracted.

In step S604, it is determined whether the extracted position is equal to or smaller than the threshold X. If the extracted position is equal to or smaller than the threshold X, the flow proceeds to step S606, otherwise the flow proceeds to step S608.

In step S606, the peripheral area is determined to be a white area.

In step S608, it is determined whether the average of the distribution of the brightness values is equal to or larger than a threshold Y. If the average is equal to or larger than the threshold Y, the flow proceeds to step S610, otherwise the flow proceeds to step S612. Accordingly, determination as to whether the peripheral area is a white area is performed separately from determination as to whether the peripheral area is a black area. For example, determination as to whether the peripheral area is a white area may be performed with high precision, and determination as to whether the peripheral area is a black area may be performed with low precision. Specifically, in step S608, the "threshold Y" may be set to 128 or higher. The criterion for determination based on this value is not as strict as a criterion defined by applying a condition that the position corresponding to the bottom 5% of the distribution of the brightness values is equal to or larger than a threshold 195 (which is a criterion for determination defined by flipping the condition that "the position corresponding to the top 5% is equal to or smaller than the threshold 60" applied in step S604 and applying the flipped condition as is as a criterion for determining a black region).

In step S610, the peripheral area is determined to be a black area, and the flow proceeds to step S614.

In step S612, the peripheral area is determined to be an unknown area, and the flow proceeds to step S614.

In step S614, it is determined whether determination is completed for all of the four edges. If determination is completed for all of the four edges, the flow proceeds to step S616, otherwise the flow returns to step S604.

In step S616, it is determined whether three or more peripheral areas are determined to have the same color. If three or more peripheral areas are determined to have the same color, the flow proceeds to step S618, otherwise the flow proceeds to step S620.

In step S618, it is determined that the background has the color of the three or more peripheral areas.

In step S620, a re-determination process is performed. The details of the process in step S620 are described below with reference to the example flowchart illustrated in FIG. 8.

FIG. 8 is a flowchart illustrating an example process according to this exemplary embodiment. The example process is an example of the process in step S516 and step S620.

In step S802, it is determined whether the number of white areas is larger than the number of black areas. If the number of white areas is larger than the number of black areas, the flow proceeds to step S804, otherwise the flow proceeds to step S806.

In step S804, it is determined that the background is a white background, and the flow ends (step S899).

In step S806, it is determined whether the number of black areas is larger than the number of white areas. If the number of black areas is larger than the number of white areas, the flow proceeds to step S808, otherwise (that is, if it is not possible to determine whether the background is white), the flow proceeds to step S810.

In step S808, it is determined that the background is a black background, and the flow ends (step S899).

In step S810, an inquiry is made to the user. For example, display is performed to prompt the user to specify whether the background is white or a color other than white. Alternatively, display is performed to prompt the user to provide an instruction for a re-scan. Specifically, display is performed to ask the user whether the user has used a white backing sheet, the user has used a black backing sheet, or the user will provide an instruction for performing re-reading (re-scan) (three buttons indicating "white", "black" and "re-reading" are displayed) to prompt the user to provide an answer. In the case of "display is performed to prompt the user to provide an instruction for a re-scan", display may be further performed to suggest that the user use a black backing sheet and place a document close to the center of the backing sheet, for example.

In step S812, the answer is determined. If the answer is "white", the flow proceeds to step S814. If the answer is "black", the flow proceeds to step S816. If the answer is "re-reading", the flow proceeds to step S818.

In step S814, it is determined that the background is a white background.

In step S816, it is determined that the background is a black background.

In step S818, advice is displayed to suggest that a document be placed close to the center to perform a re-scan.

Figure 9:
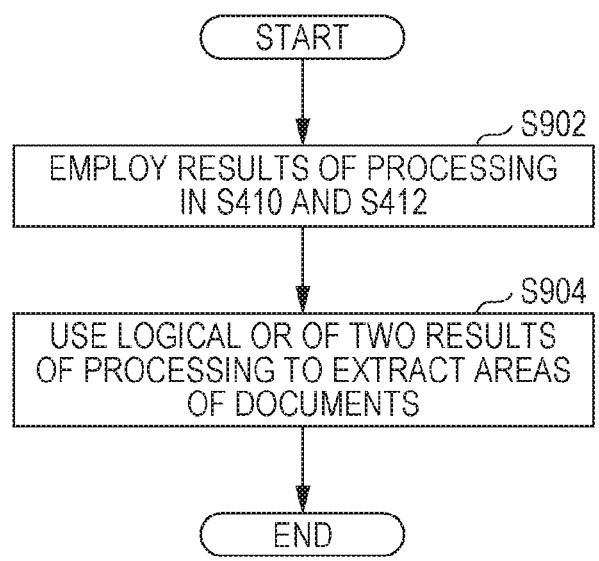
FIG. 9 is a flowchart illustrating an example process according to an exemplary embodiment of the present invention.

FIG. 9 is a flowchart illustrating an example process according to this exemplary embodiment. The example process is an example of the process in step S414.

In step S902, the result of processing in step S410 and that in step S412 are employed.

In step S904, the logical OR of the two results of processing is used to extract the areas of documents.

Figure 10:
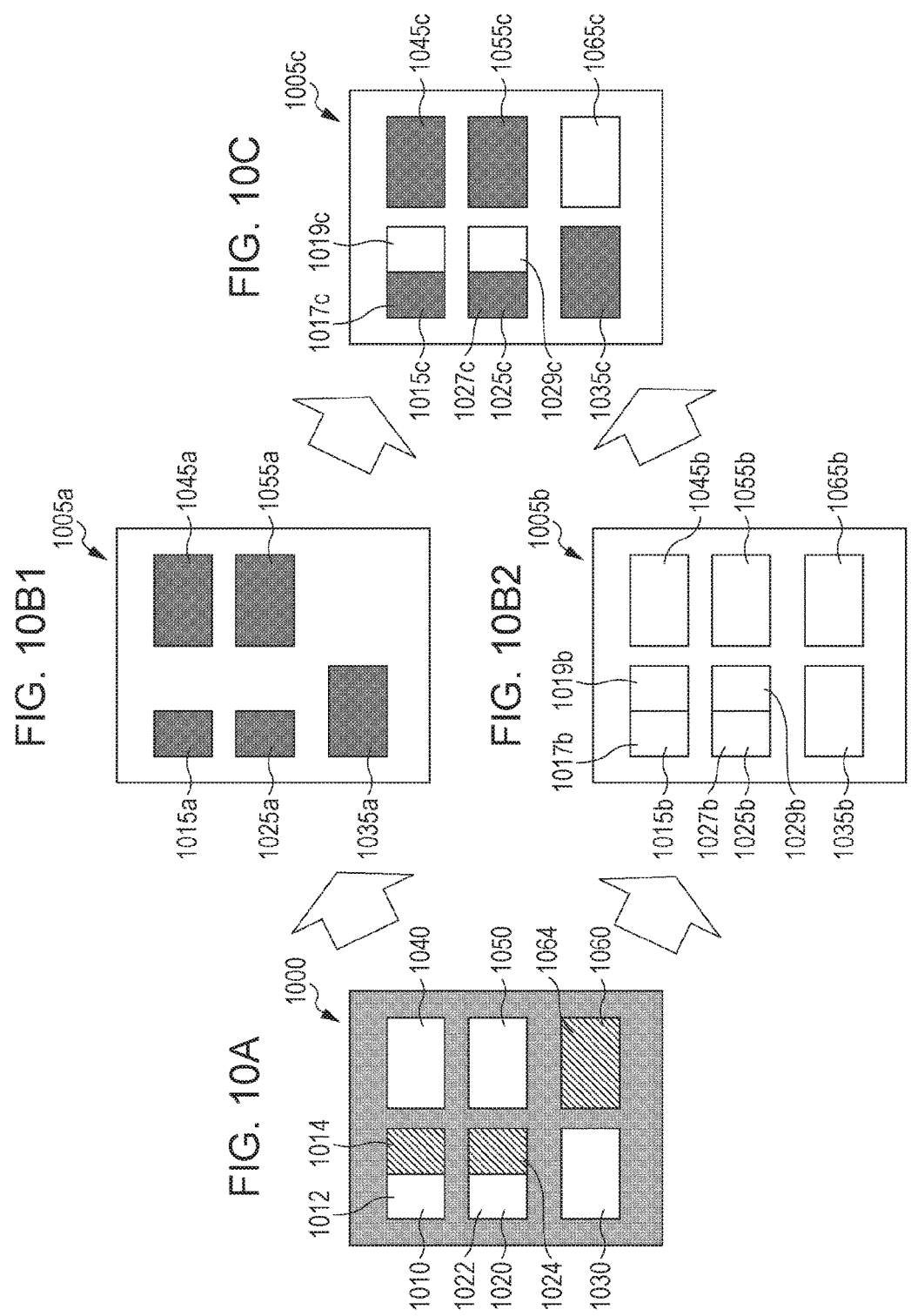
FIGS. 10A to 10C are explanatory diagrams illustrating an example process according to an exemplary embodiment of the present invention.

FIGS. 10A to 10C are explanatory diagrams illustrating the example process illustrated by the flowchart in FIG. 9.

An image 1000 illustrated in the example in FIG. 10A is assumed to be a target. The image 1000 is an image obtained by reading six business cards using a black backing sheet and is identical to the image 300b illustrated in the example in FIG. 3B1.

A process result image 1005a illustrated in the example in FIG. 10B1 is an image obtained by performing simple binarization on the image 1000.

A process result image 1005b illustrated in the example in FIG. 10B2 is an image obtained by performing edge detection on the image 1000. With the edge detection, the edges of dark portions (a blue area image 1014, a blue area image 1024, and a blue area image 1064), which are unable to be extracted in simple binarization, are successfully extracted.

A process result image 1005c illustrated in the example in FIG. 10C is obtained by performing a logical OR process on the process result image 1005a and the process result image 1005b. With the process, the edges of the dark portions (the blue area image 1014, the blue area image 1024, and the blue area image 1064) are successfully extracted, and therefore, areas (a business-card edge 1015b, a business-card edge 1025b, and a business-card edge 1065b) are successfully detected.

In the example process, the logical OR of the two results of processing are used, that is, the two results of processing are used in a ratio of 1 to 1. However, one of the results of processing may be reflected to a larger degree. For example, the second area (the result of processing by the edge component calculation module 140) may be preferentially used. For example, the reflection ratio between the two results of processing may be adjusted depending on whether the background is determined in step S514 (step S618) or the background is determined in step S516 (step S620). Specifically, in the case where the background is determined in step S514 (step S618), the two results of processing may be used in a ratio of 1 to 1. In the case where the background is determined in step S516 (step S620), the result of processing by the edge component calculation module 140 may be preferentially used. This is because, in the case where the background is determined in step S516 (step S620), the background may be erroneously determined to be black unlike in the case where the background is determined in step S514 (step S618).

In the process result image 1005b, a line detected as an edge may be broken, and therefore, the process result image 1005a is used to compensate for the break. In a case where the backing sheet has creases, the process result image 1005b may include lines produced by detecting the creases as edges. When a union operation is performed on the process result image 1005b and the process result image 1005a, it is possible to determine that an edge detected from a crease is not a line that defines a rectangular shape area.

Figure 11:
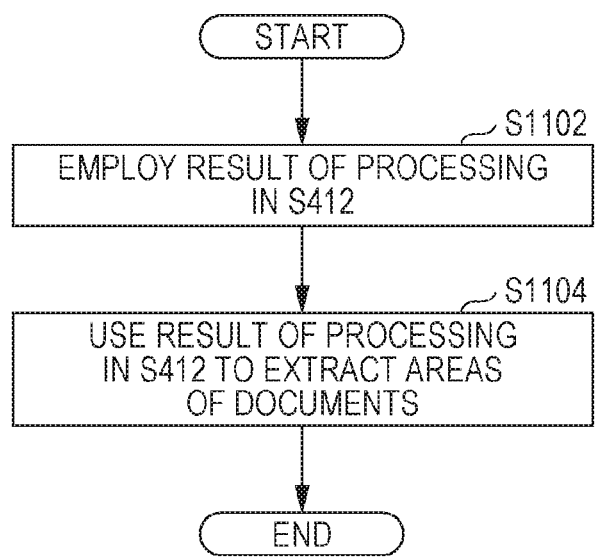
FIG. 11 is a flowchart illustrating an example process according to an exemplary embodiment of the present invention.

FIG. 11 is a flowchart illustrating an example process according to this exemplary embodiment. The example process is an example of the process in step S416.

In step S1102, the result of processing in step S412 is employed.

In step S1104, the result of processing in step S412 is used to extract the areas of documents.

Figure 12:
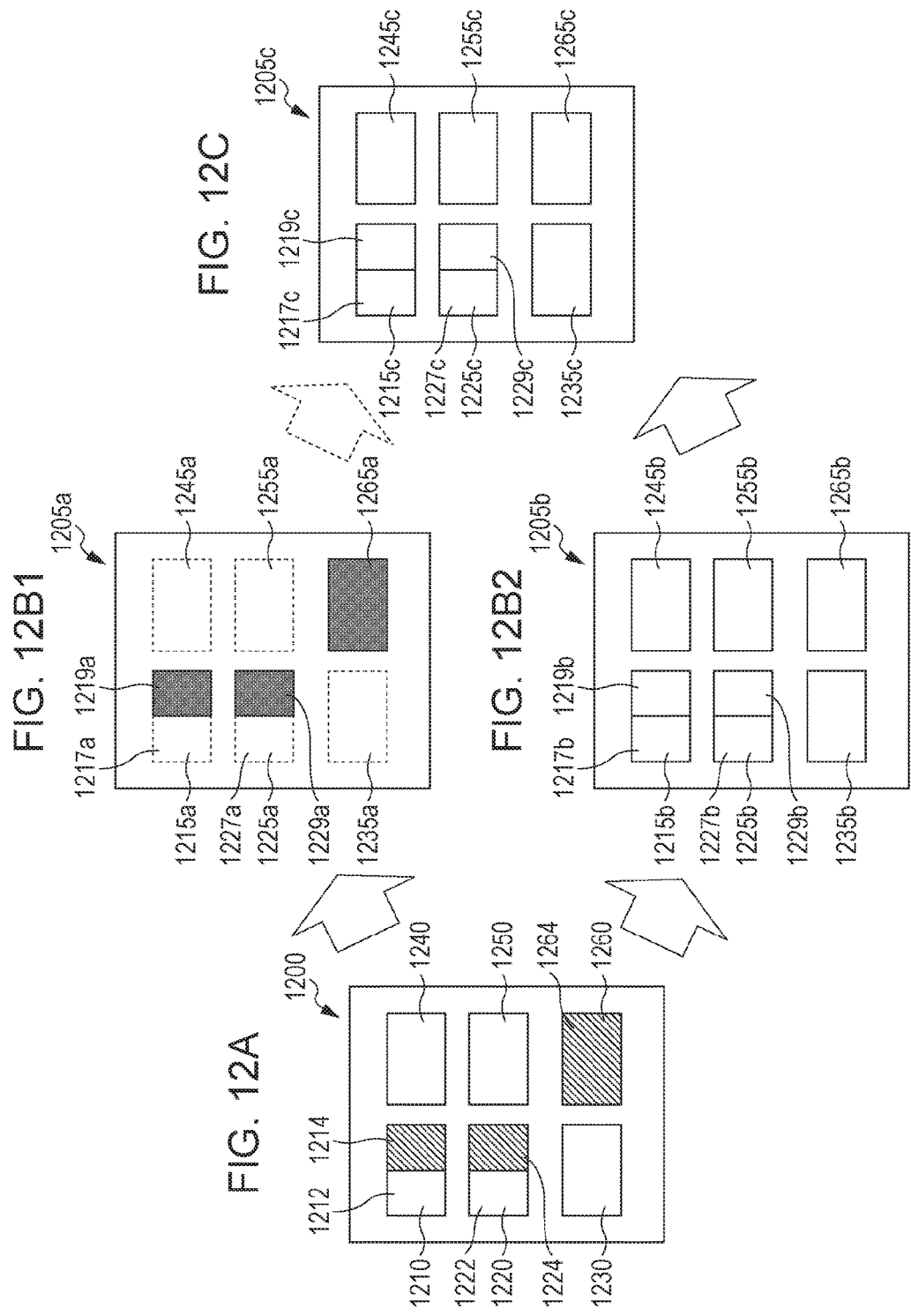
FIGS. 12A to 12C are explanatory diagrams illustrating an example process according to an exemplary embodiment of the present invention.

FIGS. 12A to 12C are explanatory diagrams illustrating the example process illustrated by the flowchart in FIG. 11.

An image 1200 illustrated in the example in FIG. 12A is assumed to be a target. The image 1200 is an image obtained by reading six business cards using a white backing sheet. The business cards are identical to business cards corresponding to the business-card image 310b and the other business-card images illustrated in the example in FIG. 3B1.

A process result image 1205a illustrated in the example in FIG. 12B1 is an image obtained by performing simple binarization on the image 1200. With the simple binarization, dark portions (a blue area image 1214, a blue area image 1224, and a blue area image 1264) are successfully extracted; however, a white area image 1212 in a business-card image 1210, a white area image 1222 in a business-card image 1220, a business-card image 1230, a business-card image 1240, and a business-card image 1250 are unable to be extracted.

A process result image 1205*b* illustrated in the example in FIG. 12B2 is an image obtained by performing edge detection on the image 1200. With the edge detection, the white portions (the white area image 1212 in the business-card image 1210, the white area image 1222 in the business-card image 1220, the business-card image 1230, the business-card image 1240, and the business-card image 1250), which are unable to be extracted in simple binarization, are successfully extracted.

The process result image 1205*b* is employed as is as a process result image 1205*c* illustrated in the example in FIG. 12C. With the process, the edges of the white portions are successfully detected as described above.

Note that, in a case where the background is determined to be white as a result of processing by the background color determination module 150, processing by the fixed-darkness-difference calculation module 130 need not be performed.

An example hardware configuration of the image processing apparatus according to this exemplary embodiment is described with reference to FIG. 14. The configuration illustrated in FIG. 14 is set up by using a personal computer (PC), for example. FIG. 14 illustrates an example hardware configuration including a data read unit 1417, such as a scanner, and a data output unit 1418, such as a printer.

A CPU 1401 is a controller that performs processes in accordance with a computer program that describes sequences to be performed by the modules described in the above-described exemplary embodiment. The modules include the data read module 110, the background color feature calculation module 120, the fixed-darkness-difference calculation module 130, the edge component calculation module 140, the background color determination module 150, and the document area estimation module 160.

A read-only memory (ROM) 1402 stores the program and operation parameters, for example, used by the CPU 1401. A RAM 1403 stores the program when the program is executed by the CPU 1401 and parameters that vary as appropriate in the execution. The CPU 1401, the ROM 1402, and the RAM 1403 are connected to one another via a host bus 1404, which is constituted by a CPU bus and so on.

The host bus 1404 is connected to an external bus 1406, such as a peripheral component interconnect/interface (PCI) bus, via a bridge 1405.

A keyboard 1408 and a pointing device 1409, such as a mouse, are devices operated by an operator. A display 1410 is a liquid crystal display or a cathode ray tube (CRT) display, for example, and displays various types of information as text or image information. A touch screen having the functions of both the pointing device 1409 and the display 1410 may be provided.

A hard disk drive (HDD) 1411 includes a hard disk (or a flash memory, for example), drives the hard disk, and records or reproduces the program executed by the CPU 1401 and information. In the hard disk, a target image, the process result table 1300, document images, and the result of processing by each module, for example, are stored. Other data and various computer programs, for example, are also stored in the hard disk.

A drive 1412 reads data or a program recorded to a removable recording medium 1413, such as a magnetic disk, an optical disk, a magneto-optical (MO) disk, or a semiconductor memory, when the removable recording medium 1413 is mounted, and feeds the data or program to the RAM 1403, which is connected via an interface 1407, the external bus 1406, the bridge 1405, and the host bus 1404. Note that the removable recording medium 1413 is also usable as a data recording area.

A connection port 1414 is a port for making a connection with an external connection device 1415 and has a USB connection portion, an IEEE 1394 connection portion, and so on. The connection port 1414 is connected to the CPU 1401 and so on via the interface 1407, the external bus 1406, the bridge 1405, and the host bus 1404, for example. A communication unit 1416 is connected to a communication line and performs an external data communication process. The data read unit 1417 is, for example, a scanner and performs a process for reading a document. The data output unit 1418 is, for example, a printer and performs a process for outputting document data.

Note that the hardware configuration of the image processing apparatus illustrated in FIG. 14 is one example configuration. This exemplary embodiment need not restrictively employ the configuration illustrated in FIG. 14 and may employ a configuration that enables implementation of the modules described in this exemplary embodiment. For example, some of the modules may be configured by using a dedicated hardware unit (for example, an application-specific integrated circuit (ASIC)), or some of the modules may reside in an external system and may be connected via a communication line. Alternatively, the system illustrated in FIG. 14 may be provided in plurality, and the plural systems may be connected to one another via communication lines and operate cooperatively with one another. Specifically, the system may be built in a PC, a portable information communication device (a portable phone, a smartphone, a mobile device, a wearable computer, or the like), a home information appliance, a robot, a copy machine, a facsimile machine, a scanner, a printer, a multifunction machine (an image processing apparatus having two or more functions among the functions provided by a scanner, a printer, a copy machine, a facsimile machine, and so on), or the like.

The phrases "equal to or larger than", "equal to or smaller than", "larger than", and "smaller than" used in the description of a comparison process in the above-described exemplary embodiment may be respectively replaced by "larger than", "smaller than", "equal to or larger than", and "equal to or smaller than" as long as the combination produces no contradiction.

The program described above may be stored in a recording medium and provided from the recording medium, or may be provided via a communication system. In this case, the program described above may be regarded as a "computer-readable recording medium storing the program".

The "computer-readable recording medium storing the program" is a computer-readable recording medium that is used to install, execute, and distribute the program, for example, and that records the program thereto.

Examples of the recording medium include a digital versatile disk (DVD) that is based on the standards developed by DVD Forum, such as a DVD-R, a DVD-RW, or a DVD-RAM, a DVD that is based on the standards developed by DVD+RW Alliance, such as a DVD+R or a DVD+RW, a compact disc (CD), such as a compact disc read-only memory (CD-ROM), a CD-Recordable (CD-R), or a CD-Rewritable (CD-RW), a Blu-ray (registered trademark) disc, an MO disk, a flexible disk (FD), a magnetic tape, a hard disk, a ROM, an electrically erasable, programmable read-only memory (EEPROM (registered trademark)), a flash memory, a RAM, a Secure Digital (SD) memory card, and so on.

All or part of the above-described program may be recorded to the recording medium for storage or distribution, for example. All or part of the above-described program may be transmitted through communication via a wired network or a wireless communication network used for a local area network (LAN), a metropolitan area network (MAN), a wide area network (WAN), the Internet, an intranet, an extranet, and so on or via a transmission medium that is a combination thereof, or may be superimposed on a carrier wave and carried.

The above-described program may constitute all or part of another program or may be recorded to a recording medium together with another program. The above-described program may be divided into pieces, which are recorded to plural recording media. The above-described program may be recorded in any form as long as the program is restorable. For example, the program may be compressed or encrypted, and recorded.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    at least one hardware processor to implement:
        controlling a scanner to scan an image;
        a first extraction unit that extracts a first area in the image that includes a plurality of document images, the first area having low-frequency characteristics;
        a second extraction unit that extracts a second area in the image, the second area having high-frequency characteristics; and
        a third extraction unit that extracts areas of the document images by combining the first area and the second area in accordance with whether a background of the image is white.

2. The image processing apparatus according to claim 1, further comprising
    a determination unit that determines whether the background is white on a basis of a brightness value of a peripheral area of the image, wherein
    the third extraction unit uses a result of determination by the determination unit.

3. The image processing apparatus according to claim 2, wherein
    the determination unit determines whether the background of the image is white by using a result of determination as to whether four peripheral areas are each a white area.

4. The image processing apparatus according to claim 2, wherein
    in a case where the determination unit determines that the background of the image is not white, the third extraction unit extracts the areas of the document images by using both the first area and the second area.

5. The image processing apparatus according to claim 4, wherein
    in a case where the determination unit determines that the background of the image is white, the third extraction unit extracts the areas of the document images by preferentially using the second area.

6. The image processing apparatus according to claim 1, wherein
    the first extraction unit extracts the first area by performing a binarization process.

7. The image processing apparatus according to claim 1, wherein
    the second extraction unit extracts the second area by performing an edge detection process or a color difference detection process.

8. The image processing apparatus according to claim 2, further comprising
    a display that performs display to prompt a user to specify whether the background is white or a color other than white or performs display to prompt the user to provide an instruction for a re-scan in a case where the determination unit fails to determine whether the background is white.

9. A non-transitory computer readable medium storing a program causing a computer to execute a process for image processing, the process comprising:
    controlling a scanner to scan an image;
    extracting a first area in the image that includes a plurality of document images, the first area having low-frequency characteristics;
    extracting a second area in the image, the second area having high-frequency characteristics; and
    extracting areas of the document images by combining the first area and the second area in accordance with whether a background of the image is white.

10. The image processing apparatus according to claim 1,
    wherein the image comprises a plurality of business cards spaced apart from each other,
    wherein the background comprises a background color,
    wherein a first one of the business cards comprises a first color,
    wherein a second one of the business cards comprises a second color, and
    wherein the at least one hardware processor is configured to implement:
        determining whether the background color is white from scanning the image;
        extracting the first one of the business cards and the second one of the business cards differently depending on whether the background color is white.

* * * * *